United States Patent [19]

Bahraman et al.

[11] 4,103,111
[45] Jul. 25, 1978

[54] HIGH SPEED ELECTRON BEAM SEMICONDUCTOR DIGITAL MULTIPLEXER

[75] Inventors: Ali Bahraman, Redondo Beach; Walter E. Crandall, Malibu, both of Calif.

[73] Assignee: Northrop Corporation, Los Angeles, Calif.

[21] Appl. No.: 800,935

[22] Filed: May 26, 1977

[51] Int. Cl.² .............................................. H04J 3/04
[52] U.S. Cl. ..................................... 179/15 A; 332/13
[58] Field of Search ..................... 179/15 A, 15 BM; 332/13, 25

[56] References Cited

U.S. PATENT DOCUMENTS

| 2,641,699 | 6/1953 | Gloess et al. | 332/13 |
| 2,733,409 | 1/1956 | Kuchinsky | 332/13 |
| 2,837,601 | 6/1958 | Warring | 179/15 A |
| 2,882,398 | 4/1959 | Adler | 179/15 A |
| 3,784,799 | 1/1974 | Crandall et al. | 179/15 BM |

Primary Examiner—Douglas W. Olms
Attorney, Agent, or Firm—Edward A. Sokolski

[57] ABSTRACT

A plurality of electron beams are generated by means of cathodes which may be arranged in a circular array and a common target to which the beams are focused. Each of the plurality of electron beams is modulated by the input digital signal (1 or 0) and an enabling signal which is applied in time sequence to the plurality of beams. In this manner the plurality of input signals may be sampled and interleaved to generate a stream of time-multiplexed electron beam digital signals sequentially ordered by the plurality of inputs onto a single diode target. Alternative methods of modulating the electron beam to the target diode may be used. In one method, the source of electrons from a field emission cathode array is modulated. An alternative method utilizes steady sources of electrons in individually focused beams with the current to the diode target being modulated by deflection of the individual beams.

16 Claims, 5 Drawing Figures

HIGH SPEED ELECTRON BEAM SEMICONDUCTOR DIGITAL MULTIPLEXER

The Government has rights in this invention pursuant to U.S. Air Force Contract No. F33615-75-C-1032.

This invention relates to signal multiplexing and more particularly to a device for achieving this end result in which digital signals are modulated onto an array of electron beams with the beams being sequentially focused onto a target from which the output is taken.

There is a great need for high speed multiplexing of digital signals for transmission over communications channels or utilization in a computer. In prior art systems multiplexing is generally achieved by means of semiconductor data processing circuits which have distinct limitations in speed of response at the required power levels. The best of such prior art circuits are generally incapable of handling data at speeds above 500 megabits/second and signal levels greater than 1 V into 50 Ω loads. In an effort to afford higher speed data handling capabilities, a device has been developed by Northrop Corporation, the assignee of the present application, which employs a focused electron beam which is converted into a conical scanning beam, this beam being passed through deflection addressing gates, each of which receives an input signal from a digital source. In this device, as the conical scanning beam passes through the deflection addressing gates, it is sequentially modulated in accordance with the digital signals applied to such gates. The conical scanning beam exiting from the deflection addressing gates is focused onto a target which provides a high-speed, digitally time-multiplexed output signal in response to the beam impinging thereon. This device is described in U.S. Pat. No. 3,784,799 issued Jan. 8, 1974 to Crandall et al and assigned to Northrop Corporation, the assignee of the present application. The device described in this prior patent, while furnishing the desired high data rate multiplexing, was found to depend very critically on achieving near perfect conical rotation and alignment as well as a very stable power supply and an extremely stable input RF signal for its conical deflection system.

The device of the present invention avoids the aforementioned criticalities of the prior art device mentioned above in that it obviates the need for conical beam rotation and the attendant alignment involved. Further, the power supply and input RF signal stability is not as critical as for this prior art device. Also, it is possible to implement the device of the present invention in a much shorter package than that of the prior art device.

It is therefore an object of this invention to provide a high speed electron beam multiplexer which is less critical in its operation than certain prior art devices.

It is a further object of this invention to provide a high speed electron beam signal multiplexer which is capable of being fabricated in a much shorter package than similar devices of the prior art.

Other objects of the invention will become apparent as the description proceeds in connection with the accompanying drawings of which:

Briefly described, the invention is as follows: A plurality of electron beams are generated by either field effect cathodes as in the preferred embodiment, or electron gun-cathodes as in the second embodiment. These beams may be arranged in a circular array and are focused (when an appropriate input is provided) onto a common target. A binary digital data input is provided to control each beam such that a "1" or "0" input will cause the associated beam to strike the target and the other of these inputs will prevent the associated beam from striking the target. The beams emanating from each cathode are time multiplexed at an RF frequency so that the bits of information contained therein are successively received at the target in interleaved fashion. This end result is achieved by modulating each of the beams with an RF signal which is successively delayed a finite amount from beam to beam. This is accomplished by means of a delay line with taps therealong for each beam channel. The target which may be in the form of a junction diode receives the time multiplexed signals and provides a stream of digital data output for data processing or transmission.

Figure 1:
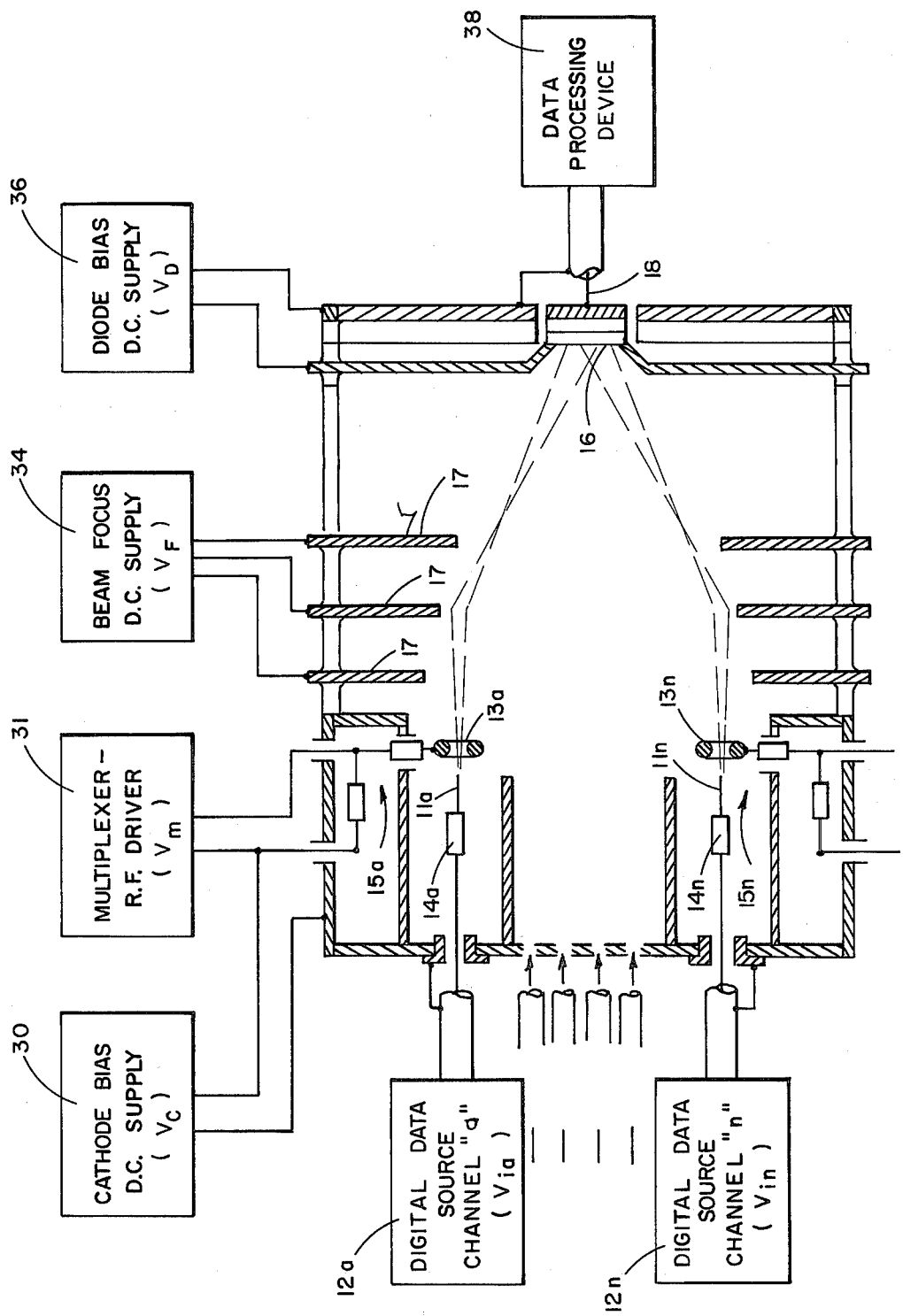
FIG. 1 is a schematic drawing illustrating the basic elements of a preferred embodiment of the invention.

Referring now to FIG. 1, the preferred embodiment of the invention uses a plurality of cathode elements 11a–11n which may be arranged in a circular configuration, each to provide an output of electrons on demand. These cathodes may be of the cold field emission type as described for example on Pages 283–304 of *Advances in Electronics and Electron Physics* published in 1973 by the Academic Press. Field emission cathodes, as is well known in the art, are generally fabricated of a metal such as titanium which emits electrons when subjected to a high level electric field. To facilitate the emission of electrons, such cathodes are generally in the form of thin wires or have a pointed configuration. The potential relative to ground of each cathode is controlled by a gate signal from an associated data source 12a–12n. This signal may take the form of a positive or negative voltage ($\pm V_i$) representing a binary input signal (1 or 0). In addition, an electrode 13a–13n for each cathode, which may take the form of a ring, is colinear with the cathode and has a fixed bias potential ($V_b$) applied thereto from DC power source 30 and a modulated potential ($\widetilde{V}_m$) applied thereto from RF multiplexer-driver 31 through an associated delay line 15a–15n. The field acting on each cathode (11a–11n) is proportional to the voltage, $V_{gcxm}$, between the cathode and the grid ring (13a–13n) as follows:

$$V_{gcxm} = V_b + \widetilde{V}_{xm} + V_{ix} \qquad (1)$$

where
$\widetilde{V}_{xm} = \widetilde{V}_m \sin[2\pi(m+x/n)\, t/\tau_m]$
$V_{ix} = \pm V_i$ for input 1 or 0 from data source
$m$ = modulation factor of modulation signal
$X = 1, 2, \ldots, n$
$V_b$ = grid ring bias voltage
$\tau_m$ = period of modulating signal ($\widetilde{V}_m$)

Electrons are emitted from a cathode if the grid-cathode potential exceeds a threshold value ($V_o$). The electron current where $V_{gcxm} > V_o$ is approximately given by the equation (see FIG. 3):

$$I_{xm} \neq a[V_{gcxm} - V_o] \qquad (2)$$

It can be seen from FIG. 3 that $I_{xm} = 0$ when $V_{gcxm} > V_o$.

The current is limited by a series resistor, $R_L$ (14a–14n), so that the electron current is approximately given by the equation (see FIG. 3)

$$I_{xm} = V_{gcxm}/R_L \qquad (3)$$

for $$I_{xm} > I_1 \text{ or } V_{gcxm} > V_1 = [\alpha R_L/(\alpha R - 1)] V_o$$

The bias potential ($V_b$), multiplexer potential ($\tilde{V}_m$) and input gate potentials ($V_i$) are given design values which meet the following criteria $$V_i \approx (V_1 - V_o) \qquad (4)$$

$$V_m \approx n V_b \qquad (5)$$

$$V_b = (V_o - V_g) \qquad (6)$$

where $n$ is the number of channels to be multiplexed. With these conditions current will only be emitted during a time increment ($\tau_m/n$) when $\tilde{V}$ is near its maximum positive value and also $V_{ix}$ is positive. If $V_{ix}$ is negative there will be no current emission at any portion of the $\tilde{V}_{xm}$ period.

Figure 3C:
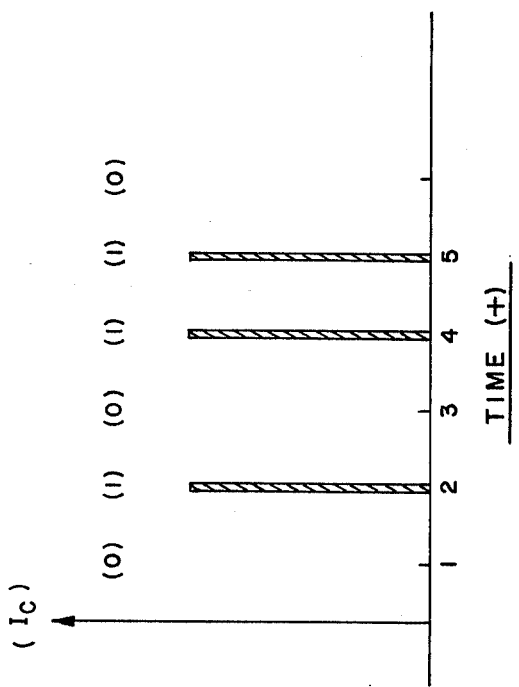
FIGS. 3A-3C are a series of wave forms illustrating the operation of the preferred embodiment, shown in FIG. 1.
Figure 3B:
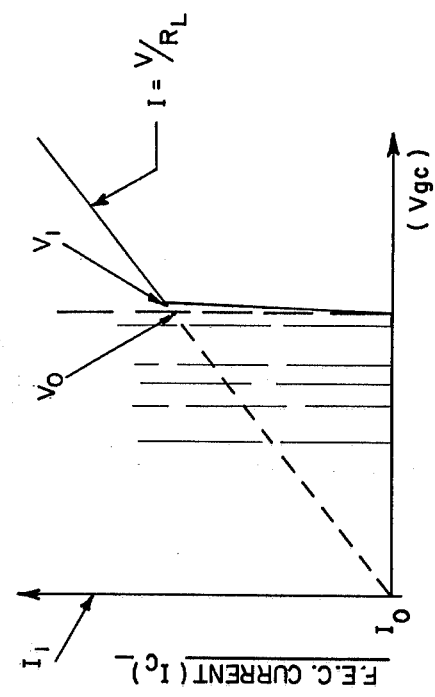
Figure 3A:
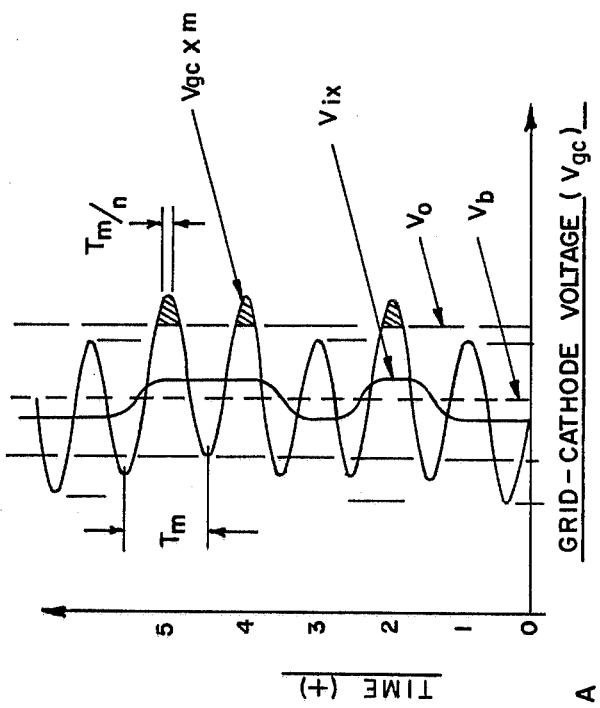

FIGS. 3A–3C illustrate the operation of a single channel of the preferred embodiment in response to an input from a single data source. FIG. 3A is a plot of the grid-cathode voltage ($V_{gc}$) against a time base. This voltage is varied as a function of the algebraic sum of the input ($V_{ix}$) to the channel fed to the cathode from its associated data source, the multiplexing signal ($\tilde{V}_{xm}$) for the channel fed to the grid ring from the multiplexer and the bias voltage ($V_b$). The voltage level indicated by "$V_o$" is the threshhold level for cathode current ($I_c$). Thus, whenever $V_{gc}$ exceeds $V_o$, current is generated. For illustrative purposes, the data source is shown as having a six-bit binary output. The illustrative input signal represented by "$V_{ix}$" is 010110. FIG. 3C in conjunction with FIG. 3B shows the cathode current ($I_c$) resulting from the input ($V_{ix}$) of FIG. 3A. As can be seen, this faithfully reproduces the digital input. The multiplexer signal $\tilde{V}_m$ as already noted is delayed (or phase shifted) a discrete amount $\tau_m/n$ from channel to channel by means of delay line sections 15a–15n so that the digital outputs from successive channels will appear sequentially with their bits interleaved with each other. FIG. 3B illustrates how the output current pulses ($I_i$) are generated each time $V_{gc}$ exceeds $V_o$.

The modulated potential ($\tilde{V}_{xm}$) on successive channels are shifted by time increments ($\tau_m/n$) by the delay line segment (15a–15n) and therefore the input signals from the $n$ channels create an interleaved stream of data impulses on the target diode (16) for the $n$ fold beams.

The electron beams are focused onto target 16 by means of ring focusing electrodes 17 which receive beam focusing DC potentials ($V_F$) from beam focus DC supply 34. Target diode 16 receives a beam accelerating potential which may be of the order of 10KV from diode bias DC supply 36.

The beam electrons penetrate into the intrinsic region of the target diode creating a large number of electron-hole pairs (~1000) per incident electron. The diode bias potential sweeps these electrons out of the intrinsic region generating an amplified current stream on output line 18 which is an amplified replica of the multiplexed emission current from the field emission cathodes. Output line 18 may be fed to data processing device 38 or to a communications link for transmission.

Figure 2:
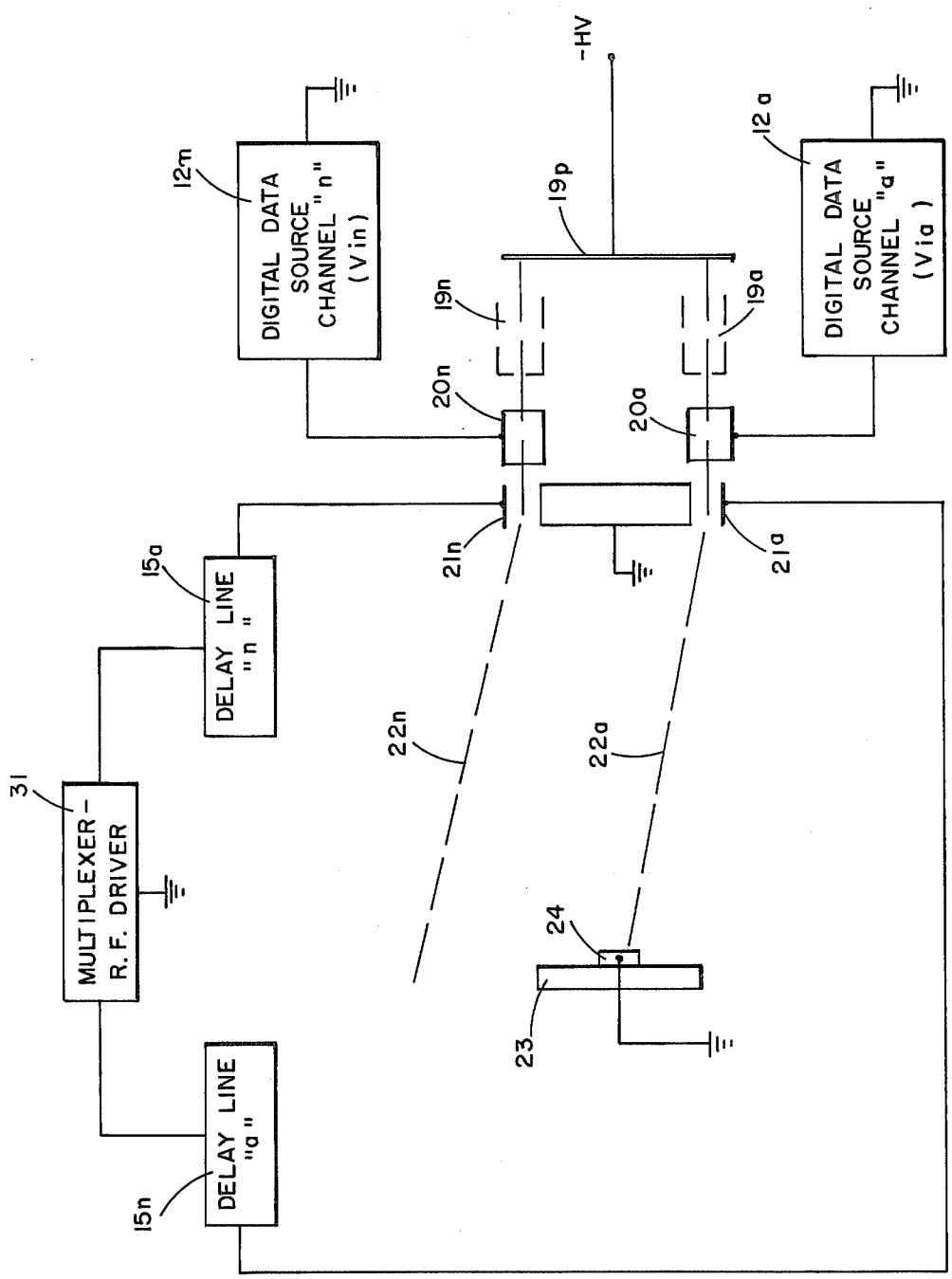
FIG. 2 is a schematic drawing illustrating a second embodiment of the invention.

A second embodiment of the invention is shown in FIG. 2. In this embodiment, the electron beams from a number of electron guns (19a–19n), which utilize a common electron source 19p which may be thermionic or of the cold cathode type, are focused by means of the optics of the guns and sequentially addressed and deflected onto a single diode target to produce a serial output data pattern corresponding to the input data. Two sets of deflection plates are used for this addressing scheme for each gun, as shown in FIG. 2. The electron guns are arranged in a circular array which is concentric with the target diode 24. The electron beam from each gun first traverses an input-data pair of cylindrical deflection plates (20a–20n) which receives digital pulses of amplitude $V_{ix}$ as input data (1 or 0) from an associated one of digital sources 12a–12n. In addition, a DC voltage may be used for each pair of deflection plates to align the beam relative to the target.

After being addressed, each electron beam goes through a pair of RF deflection plates (21a–21n) and receives an RF deflection signal which originates in multiplexer-RF driver 31 and is successively delayed a finite amount for each deflection plate by means of an associated delay line circuit 15a–15n, in the same general fashion as described in connection with the preferred embodiment. If the input data from any data source 12a–12n is 0, the electron beam strikes the target 24 at the point of maximum RF deflection, as shown by line 22a, thus producing an output pulse. If the input data is 1, the electron beam will be deflected in a direction perpendicular to its radial deflection as shown by line 22n, and will not strike the target. The opposite mode of operation is also possible — with 0 input the beam does not strike the target, and with 1 input it does. Each pair of RF deflection plates may have a DC bias for beam alignment. Heat sink 23 is used to dissipate heat generated in target 24.

In the above scheme, one output bit is generated per gun in each RF deflection period $\tau_m$. For $n$ guns, $n$ bits are generated in one RF period; that is, an output data rate of $n/\tau_m$. In order to achieve a time-sequenced stream of $n$ output data pulses within the time period $\tau_m$, it is necessary to have a delay of $\tau_m/n$ between the RF signals of two adjacent RF deflection plates. The output data pulse width is $\leq \tau_m/n$ per bit and is equal to the time duration that each electron beam strikes the target diode. This time duration is controlled by the RF deflection amplitude, the beam spot size, and the RF period. The target diode must have sufficient bandwidth to generate a pulse of $\tau_m/n$ width with no decrease in amplitude due to RC or transit-time limitations.

As an example, for $\tau_m = 4$ ns and $n = 8$, the output data rate is 2 gigabits/s and the output pulse width per bit is $\leq 0.5$ ns. A target rise-time of 0.2 ns will satisfy the device requirements.

A second mode of operation is feasible that reduces the number of guns by a factor of two for the second embodiment of the inversion. The electron beam from each gun is allowed to strike the target at the point of zero RF deflection. Hence, two output pulses are produced per gun in each RF deflection period. For eight bits then, four electron guns will suffice.

The target (18 for the preferred embodiment and 24 for the second embodiment) may comprise a target diode such as a small p-n junction target diode. Typically a silicon-diffused p-n junction diode may be utilized for the target, with the junction being located or positioned at a depth below the surface of about ½ micron. With the beam having an energy of 10 kilovolts, the junction depth of the target diode should be less than 0.5 micron for proper operation. It is to be noted that it is necessary to provide junction passivation at the junction of this diode so that the junction is not subject to damage by the electron beam. This can generally be achieved, for example, by growing an oxide and polycrystalline silicon layer over the junction. Junction target diodes are well known in the art and are described, for example, starting on Page 78 of Physics of Semiconductor Devices by S. M. Sze, Wiley Interscience, New York (1969). The fabrication of EBS target diodes is described by the authors in *Technical Digest of IEEE Electron Device Meeting*, 216 (1974). (Also authored by O. L. Curtis, Jr.)

The first embodiment of the invention (FIG. 1) utilizes a field emission cathode source which does not require input power except when electrons are required for the precise increment of time necessary for data transmission ($\tau_m/n$). Since the cathode is cold, it does not radiate thermal energy and it is extremely small and time responsive ($<10^{-13}$s). For these reasons, it is ideal for a compact, high speed, high power multiplexer. It does requires a high vacuum for reliable operation.

The second embodiment of the invention (FIG. 2) utilizes a steady cathode source and therefore does not require source current modulation but instead deflects the steady beam from the target to create the desired output modulation. Thermal sources can be used which are reliable and do not require as high a vacuum. But these hot cathode emitters are much larger than the field emitting cathodes, require much more power, and require considerable focusing to create the necessary collimated beam for deflection. The deflection electrodes must be relatively long to achieve the required deflection and most of the accelerated beam dissipates its energy in a non-useful manner elsewhere than on the target diode. Nevertheless a multiplexer of the form of the second embodiment of the invention can outperform existing multiplexers and therefore, despite its shortcomings as compared with the first embodiment, still represents a distinct advance over the prior art.

While the invention has been described and illustrated in detail, it is to be clearly understood that this is intended by way of illustration and example only and is not to be taken by way of limitation, the spirit and scope of this invention being limited only by the terms of the following claims.

We claim:

1. A system for time multiplexing together the digital signal outputs of a plurality of digital data sources comprising:
   means for generating a plurality of electron beams, each of said beams providing a carrier for a separate data channel,
   means for modulating each of said beams with a separate one of said digital data source outputs,
   an electron sensitive target,
   means for sequentially gating said beams, and
   means for focusing each beam onto said target at times when each such beam is being gated and a predetermined digital output is modulating such beam,
   whereby said target receives the digital data source outputs in time multiplexed form.

2. The system of claim 1 wherein the means for generating said electron beams comprises a plurality of electron guns.

3. The system of claim 1 wherein the means for generating said electron beams comprises a plurality of field effect cathodes.

4. The system of claim 3 wherein said cathodes are arranged in a circular configuration.

5. The system of claim 1 wherein the means for modulating each of said beams comprises means for feeding the output of each of the digital data sources to a separate one of the beam generating means so as to control the potential thereon.

6. The system of claim 1 wherein the means for modulating each of said beams comprises a separate pair of deflection plates between which each of said beams passes and means for feeding the output of each of the digital data sources to a separate pair of said deflection plates whereby each beam is radially deflected in response to the potential between the associated pair of deflection plates.

7. The system of claim 1 wherein the means for sequentially gating the beams to the target in time multiplexed form comprises a separate control member past which each of said beams travels, means for providing an oscillatory signal and means for delaying said signal finite equal successive amounts for each beam, the successively delayed oscillatory signals each being fed to one of said grid members to provide a predetermined phase difference between said signals from grid member to grid member.

8. The system of claim 7 wherein said control members are in the form of grid rings through which the beams pass.

9. The system of claim 7 wherein said oscillatory signal is an RF signal.

10. The system of claim 7 wherein said control members are in the form of paired deflection plates between which each of said beams passes.

11. The system of claim 1 wherein the target comprises a junction target diode.

12. The system of claim 3 wherein the means for focusing said beams comprises a set of ring focusing electrodes through which the beams pass and means for providing beam focusing potentials to said electrodes.

13. A system for time multiplexing together the digital signal outputs of a plurality of digital data sources comprising:
   a plurality of field effect cathodes arranged in a ring, each of said cathodes providing a separate beam of electrons,
   an electron target,
   means for providing a potential between the cathodes and the target so as to accelerate said beams towards the target,
   means for modulating each of said beams with the signal output of a separate one of said data sources whereby each beam is present only when the modulating signal therefor has a predetermined digital sense,
   means for providing an RF signal,
   a delay line receiving said RF signal and having a plurality of sections each for providing a predetermined incremental delay in said RF signal,
   a beam control member past which each of said beams passes, the output of a separate section of said delay line being fed to each of said beam control members, and means for focusing each of said beams, when present, onto said target, whereby the beams are sequentially gated through their associated control members to the target at a rate determined by the frequency of the RF signal.

14. The system of claim 13 wherein the beam control members comprise grid rings through which the beams pass.

15. The system of claim 13 wherein the target comprises a junction target diode.

16. The system of claim 13 wherein the means for focusing said beams comprises a set of ring focusing electrodes through which the beams pass and means for providing beam focusing potentials to said electrodes.

* * * * *